United States Patent
Hamzeh et al.

(10) Patent No.: US 11,121,952 B2
(45) Date of Patent: Sep. 14, 2021

(54) DEVICE HEALTH ASSESSMENT DATA SUMMARIZATION USING MACHINE LEARNING

(71) Applicant: Cisco Technology, Inc., San Jose, CA (US)

(72) Inventors: Mohammed Hamzeh, Louvain-la-Neuve (BE); Sam Grimee, Senningerberg (BE); Cedric Van Labeke, Temse (BE); Peter Van Eynde, Edegem (BE); Raphaël Wouters, Lincent (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/162,549

(22) Filed: Oct. 17, 2018

(65) Prior Publication Data

US 2020/0127910 A1 Apr. 23, 2020

(51) Int. Cl.
*G06N 20/00* (2019.01)
*H04L 12/26* (2006.01)
*H04L 12/24* (2006.01)

(52) U.S. Cl.
CPC ......... *H04L 43/0817* (2013.01); *G06N 20/00* (2019.01); *H04L 41/22* (2013.01); *H04L 43/14* (2013.01)

(58) Field of Classification Search
CPC ......... H04L 43/04; H04L 43/08; H04L 43/16; H04L 41/0816; H04L 41/16; H04L 63/1425; H04L 41/08; H04L 43/0817; H04L 41/22; H04L 43/14; G06F 11/0793; G06F 11/0715; G06N 20/00
See application file for complete search history.

(56) References Cited

U.S. PATENT DOCUMENTS 6,668,368 B1 * 12/2003 Hernandez, III ......... G06F 8/30
   717/115
8,364,613 B1    1/2013 Lin
9,069,737 B1 *  6/2015 Kimotho .............. G06F 11/1484
9,842,297 B1 * 12/2017 Deluca ..................... G06N 5/02
(Continued)

OTHER PUBLICATIONS

Network Switch Archived by Wayback Machine—https://web.archive.org/web/20151105083549/https://en.wikipedia.org/wiki/Network_switch (Year: 2015).*
(Continued)

*Primary Examiner* — Jonathan A Bui
*Assistant Examiner* — Zonghua Du
(74) *Attorney, Agent, or Firm* — Behmke Innovation Group LLC; Kenneth J. Heywood; Jonathon P. Western

(57) ABSTRACT

In one embodiment, a device health assessment service extracts device health status indicators from health assessment data that the service uses to determine a device health status of a networking device. The service forms, using the extracted set of device health status indicators, a health status signature for a particular device health status. The service trains a machine learning-based model to classify whether a networking device has the particular device health status, based in part on the health status signature. The service deploys the machine learning-based model to a target network for local device health assessment of one or more networking devices in the target network.

15 Claims, 11 Drawing Sheets

(56) References Cited

U.S. PATENT DOCUMENTS

| | | | |
|---|---|---|---|
| 2003/0204588 A1* | 10/2003 | Peebles | G06F 11/3495 |
| | | | 709/224 |
| 2007/0282470 A1 | 12/2007 | Hernandez et al. | |
| 2012/0173691 A1* | 7/2012 | Kothe | H04L 41/0226 |
| | | | 709/223 |
| 2013/0073486 A1* | 3/2013 | Petrick | H04L 41/142 |
| | | | 706/12 |
| 2014/0122618 A1 | 5/2014 | Duan | |
| 2014/0164400 A1* | 6/2014 | Kruglick | G06F 16/9566 |
| | | | 707/749 |
| 2016/0261465 A1* | 9/2016 | Gupta | H04L 41/14 |
| 2016/0349293 A1 | 12/2016 | Chattopadhyay | |
| 2016/0350102 A1 | 12/2016 | Karpuram | |
| 2017/0093629 A1* | 3/2017 | Cong | H04L 41/0853 |
| 2017/0104773 A1* | 4/2017 | Flacher | H04L 63/1458 |
| 2017/0279839 A1* | 9/2017 | Vasseur | H04L 63/1416 |
| 2017/0339213 A1* | 11/2017 | Dukatz | G06N 5/02 |
| 2018/0167414 A1 | 6/2018 | O'Reilly | |
| 2019/0141079 A1* | 5/2019 | Vidas | G06N 7/005 |
| 2019/0260665 A1* | 8/2019 | Barnum | H04L 63/0236 |
| 2019/0273510 A1* | 9/2019 | Elkind | G06F 8/74 |
| 2019/0281476 A1* | 9/2019 | Lyon | H04W 24/04 |
| 2019/0319839 A1* | 10/2019 | Nozhchev | H04L 41/0816 |

OTHER PUBLICATIONS

Cisco Connected TAC; https://www.cisco.com/c/dam/en/us/support/docs/services/connected-tac/Connected_TAC_At-A-Glance.pdf; 2017.
International Search Report dated Mar. 17, 2020 in connection with PCT/US2019/054489.

* cited by examiner

400

Supervisor_states_Unknown
Invisible/CHH

Supervisor_states_HA_standby
Invisible/CHH

Supervisor_states_Active
Invisible/CHH

Storm_control_field_TotalSuppDiscards
Invisible/CHH show_vrrp_master
Invisible/CHH show_vrrp_backup
Invisible/CHH show_vpc_type2_consistency
EzBorg show_vpc_peer_gateway
Invisible/CHH

FIG. 4

DEVICE HEALTH ASSESSMENT DATA SUMMARIZATION USING MACHINE LEARNING

TECHNICAL FIELD

The present disclosure relates generally to computer networks, and, more particularly, to device health assessment data summarization using machine learning.

BACKGROUND

Computer networks are becoming increasingly complex, as they continue to grow and transmit communications between more and more endpoint devices. Notably, many computer networks now include a wide variety of networking devices to support these communications, each device having its own configuration in terms of hardware, software, interconnections, and the like. For example, a given network may include any number of access points, access point controllers, switches, routers, and the like, to support the various communications on the network.

The ever-increasing complexity of computer networks also means that making device health assessments in a network is also ever-increasing in complexity. Indeed, a certain device health issue may only arise under certain device conditions, such as when the device is running a specific version of software, when the resources of the device are at a threshold level, when the device is using a specific set of parameters, etc. The commands needed to access this information are also diverse and increasingly complex. For example, a new version of a device operating system may introduce new command line interface (CLI) commands.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example set of health assessment data;

DESCRIPTION OF EXAMPLE EMBODIMENTS

Overview

Figure 1A:
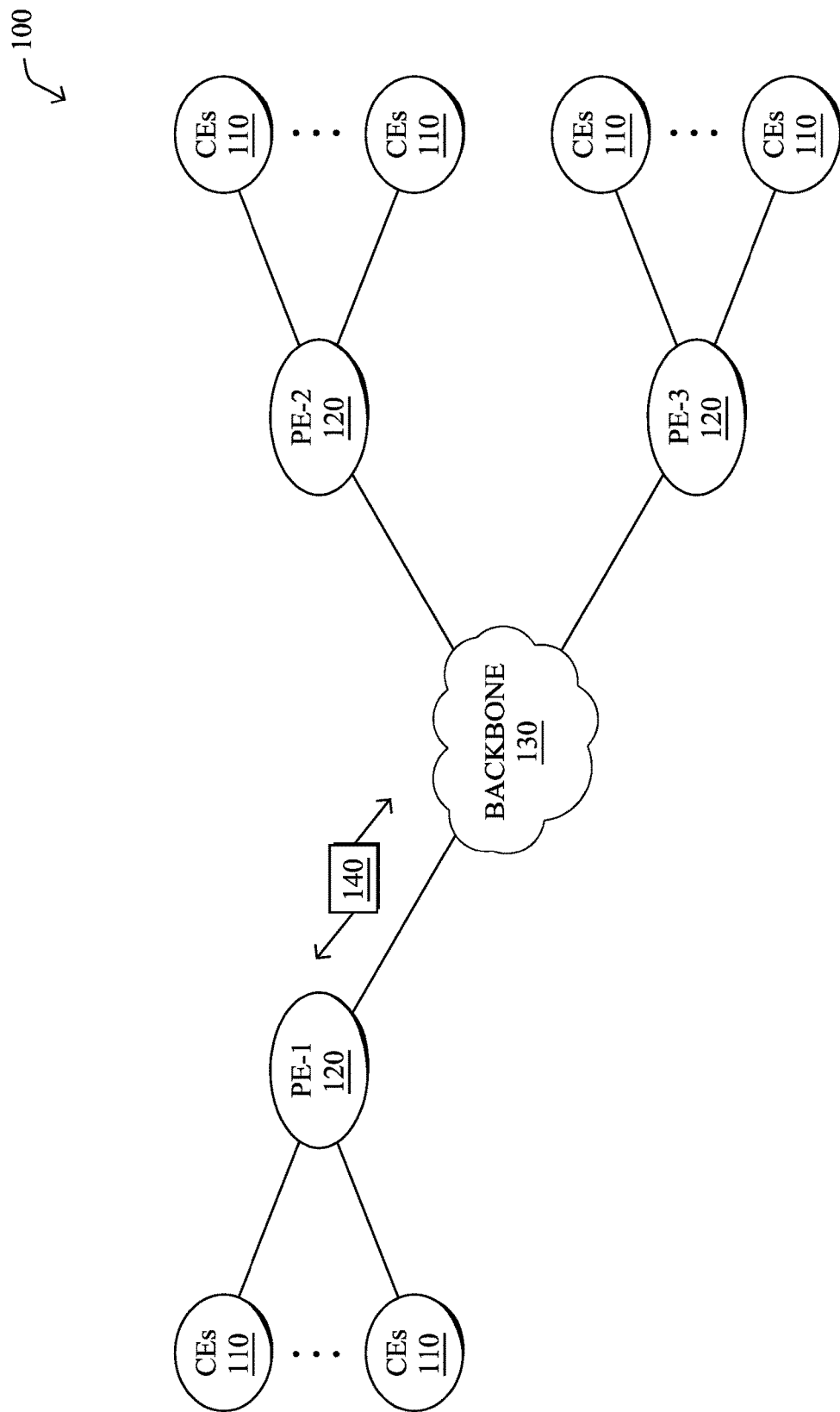
FIGS. 1A-1B illustrate an example communication network.

According to one or more embodiments of the disclosure, a device health assessment service extracts device health status indicators from health assessment data that the service uses to determine a device health status of a networking device. The service forms, using the extracted set of device health status indicators, a health status signature for a particular device health status. The service trains a machine learning-based model to classify whether a networking device has the particular device health status, based in part on the health status signature. The service deploys the machine learning-based model to a target network for local device health assessment of one or more networking devices in the target network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
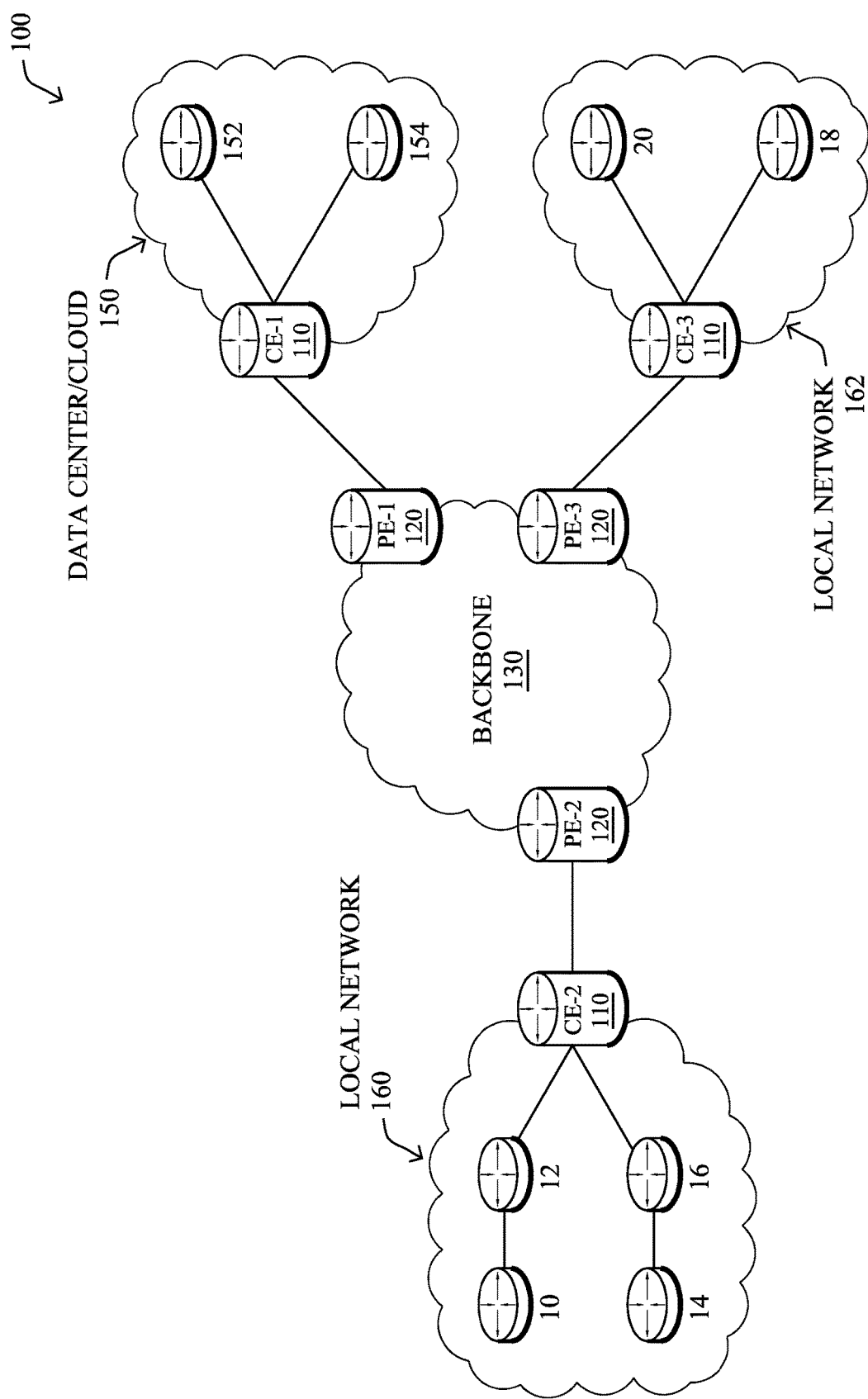

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their associated interconnections are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
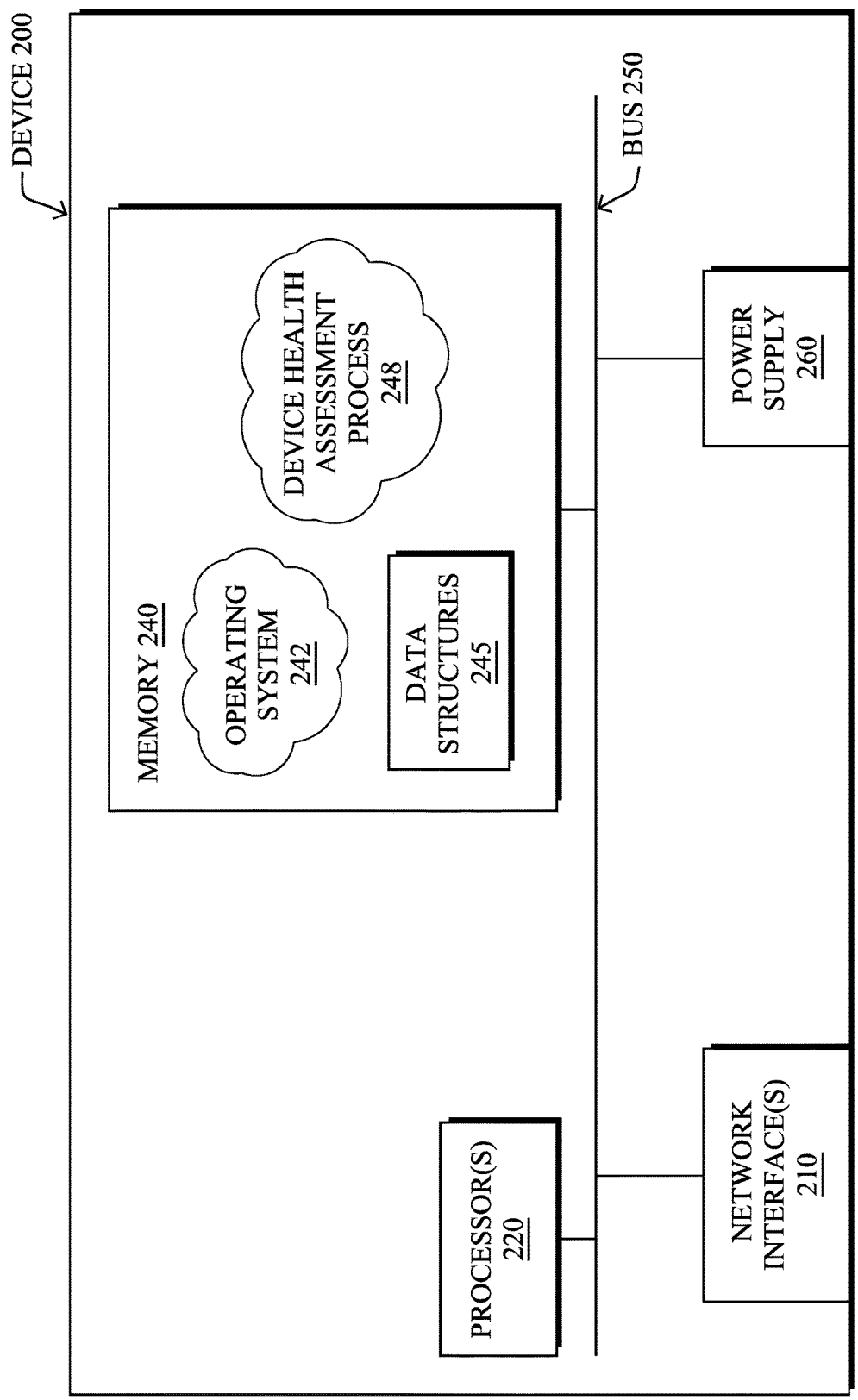
FIG. 2 illustrates an example device.

FIG. 2 is a schematic block diagram of an example device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device health assessment process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
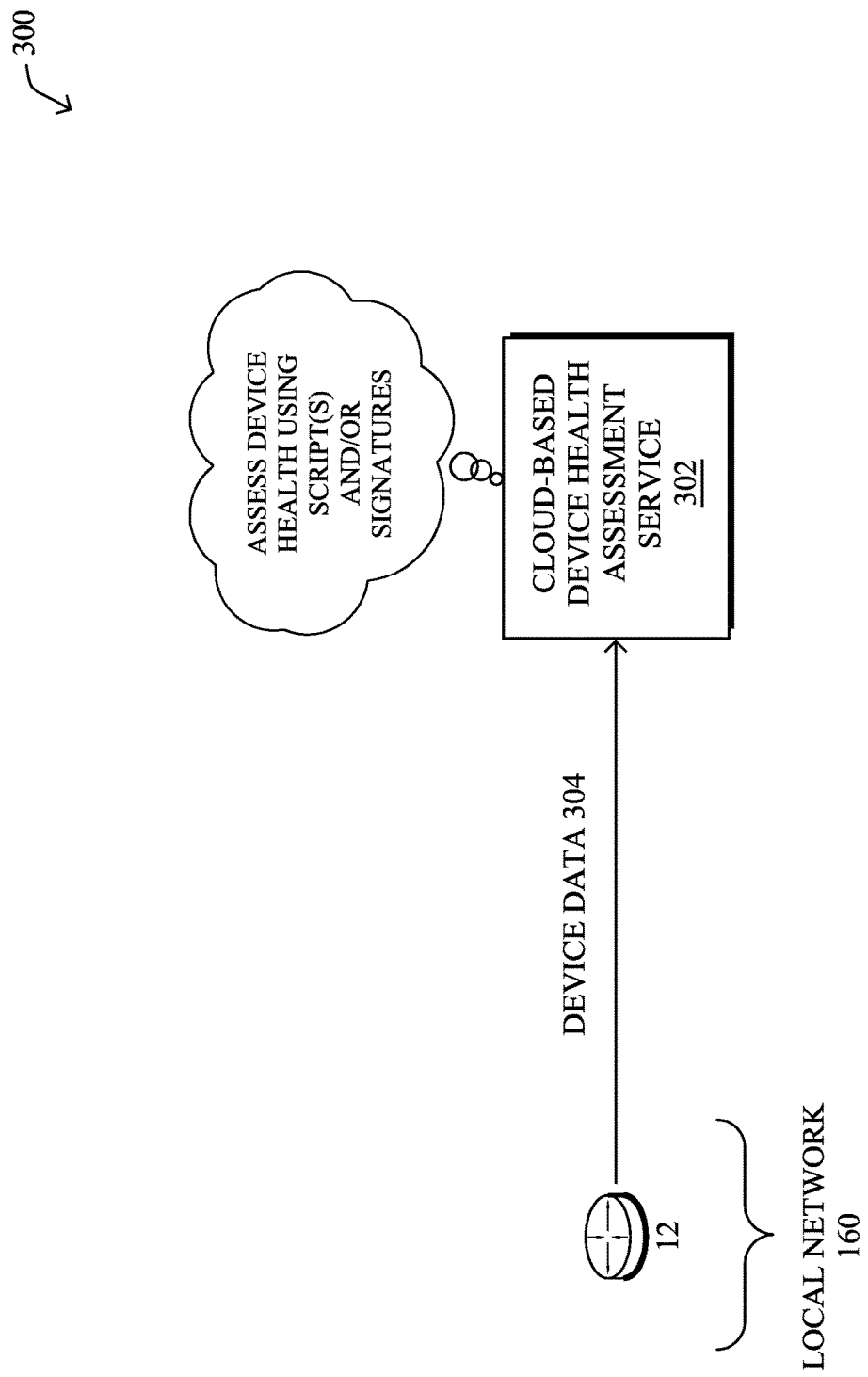
FIG. 3 illustrates an example of a cloud-based device health assessment service.

In general, device health assessment process 248 may be configured to determine the health status of networking devices, such as routers, switches, and the like. For example, device health assessment process 248 may be executed to implement a cloud-based health assessment service. An example 300 of such a cloud-based health assessment service is shown in FIG. 3. Notably, assume that device 12 in local network 160, described previously with respect to FIG. 3, is to undergo a health status assessment by cloud-based health assessment service 302. In such a case, device data 304 may be sent from local network 160 to cloud-based health assessment service 302, either directly by networking device 12 or, alternatively, via an intermediate, such as an NMS, device data collection platform, or the like. Such device data 304 may include, for example, command line interface (CLI) outputs, system log data, or any other information that can be used to discern the health status of networking device 12.

During operation, health assessment service 302 may leverage a large body of health assessment data developed potentially over many years, to assess the health status of a networking device from its device data. For example, such health assessment data may relate device configuration and/or operational information to various health statuses. For negative health statuses, the health assessment data may also relate the negative status to one or more suggested actions, such as updating the software of the device under scrutiny, making a configuration change to the device, etc. In some embodiments, the health assessment data may be converted into any number of automated scripts that health assessment service 302 can use to parse device data 304 and determine the health status of networking device 12. In turn, health assessment service 302 may provide an indication of the health assessment to a user interface, such as a user interface controlled by a network administrator of local network 160.

FIG. 4 illustrates an example set 400 of health assessment data that health assessment service 302 may apply to device data 304. For example, as shown, set 400 may include automated scripts such as "Supervisor_states_Unknown," "Supervisor_states_HA_standby," etc. Each script may be executed to assess device data 304 individually or, in some embodiments, in batches. For example, a certain set of health assessment scripts may be grouped together, to assess a certain health aspect of a networking device (e.g., a certain category of health issues).

While a cloud-based device health assessment service has the advantage of being able to draw information from any number of deployed networks, sending device data to the cloud for analysis is a security concern, in some cases. Notably, some network operators may not wish to expose their device configurations, etc., externally. One solution to this would be to deploy a local copy of device health assessment service 302 to the local network(s) that cannot use a cloud-based implementation. However, doing so also would expose the health assessment data of the service outside of the device manufacturer, thereby creating the possibility of a malicious entity exploiting the health assessment data for malicious purposes (e.g., intentionally exploiting a known bug, etc.

Device Health Assessment Data Summarization Using Machine Learning

The techniques herein allow device health assessment data of a device health assessment service to be summarized in the form of machine learning-based models. In some aspects, these models can be trained to make device health assessments in a manner that does not expose the health assessment data used to train the models. Accordingly, the models can be deployed to a target network for local execution in the network, allowing for local health assessments to be made of the networking devices in the network and without having to export device data from the local network.

Specifically, according to one or more embodiments of the disclosure as described in detail below, a device health assessment service extracts device health status indicators from health assessment data that the service uses to determine a device health status of a networking device. The service forms, using the extracted set of device health status indicators, a health status signature for a particular device health status. The service trains a machine learning-based model to classify whether a networking device has the particular device health status, based in part on the health status signature. The service deploys the machine learning-based model to a target network for local device health assessment of one or more networking devices in the target network.

Illustratively, the techniques described herein may be performed by hardware, software, and/or firmware, such as in accordance with the device health assessment process 248, which may include computer executable instructions executed by the processor 220 (or independent processor of interfaces 210) to perform functions relating to the techniques described herein.

Figure 5A:
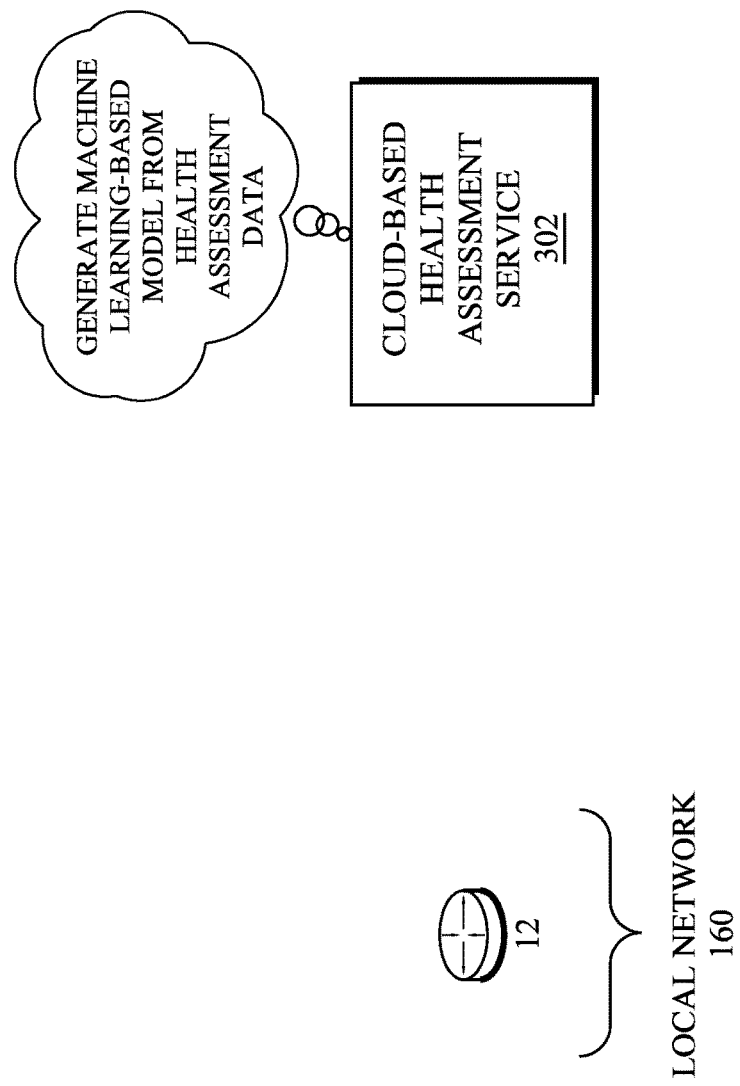
FIGS. 5A-5C illustrate an example of the deployment of a machine learning-based model to a target network for device health assessments.
Figure 5B:
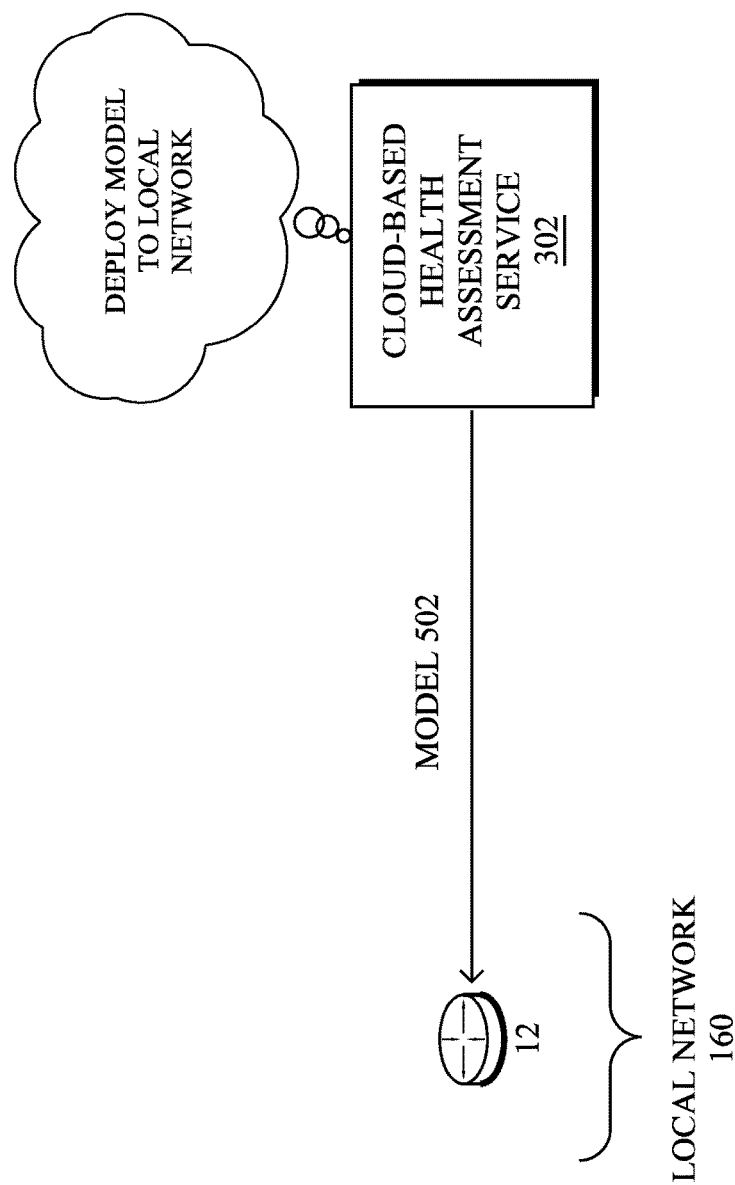
Figure 5C:
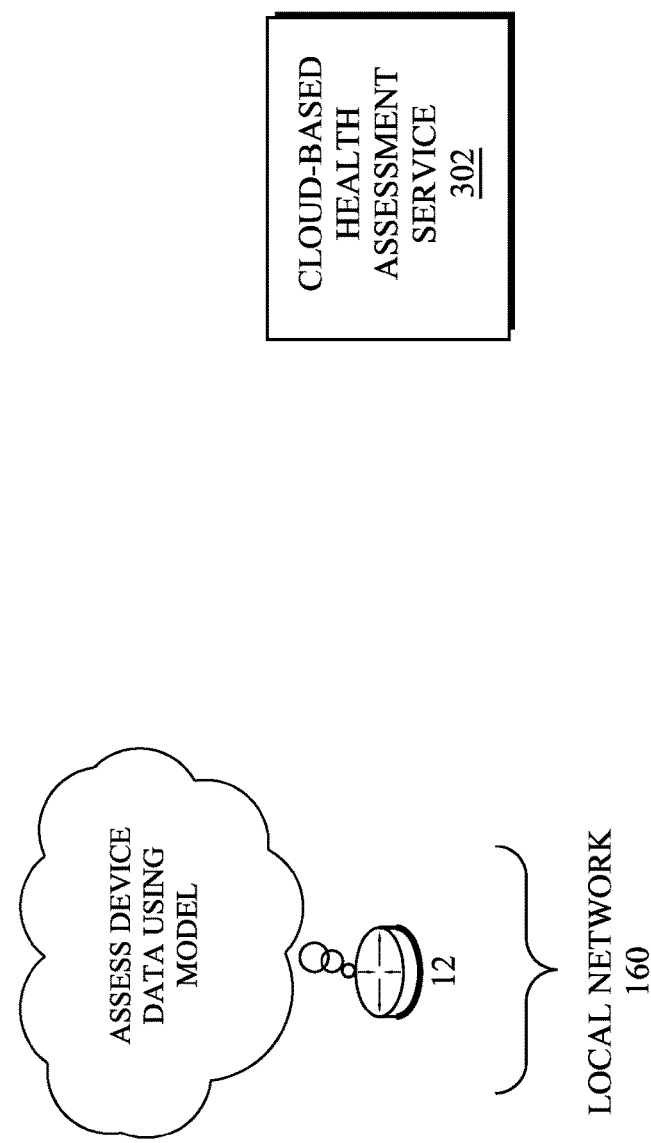

Operationally, FIGS. 5A-5C illustrate an example 500 overviewing the deployment of a machine learning-based model to a target network for device health assessments, according to various embodiments. Continuing the example of FIG. 3, consider the case in which a device health assessment is to be made for networking device 12 located in local network 160 that is remote from cloud-based health assessment service 302.

As shown in FIG. 5A, cloud-based health assessment service 302 may train a machine learning-based model using its body of health assessment data to make a health assessment of networking device 12. More specifically, health assessment service 302 may train a machine learning-based model to determine whether networking device 12 has a particular device health status, based on its device data.

In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the model M can be used to classify new data points, such as new device data from networking device 12 and/or another networking device in local network 106. Often, M is a statistical model, and the cost function is inversely proportional to the likelihood of M, given the input data.

In various embodiments, the machine learning-based model generated by health assessment service 302 may employ one or more supervised, unsupervised, or semi-supervised machine learning models. Generally, supervised learning entails the use of a training set of data, as noted above, that is used to train the model to apply labels to the input data. For example, the training data may include sample device data that is indicative of a certain device health status or not indicative of that status. On the other end of the spectrum are unsupervised techniques that do not require a training set of labels. Notably, while a supervised learning model may look for previously patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that a machine learning-based model generated by device health assessment service 302 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly classified networking devices as having a certain health status. Conversely, the false negatives of the model may refer to the number of times the model incorrectly determined that a device did not have that health status. True negatives and positives may refer to the number of correct health status determinations in the negative or positive, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As shown in FIG. 5B, once cloud-based health assessment service 302 has trained machine learning-based model 502, it may deploy model 502 to local network 160. In some embodiments, model 502 may be executed on a device in network 160 that supports the operation of networking device 12, such as an NMS, device data collection server, or the like. In further embodiments, as shown in FIG. 5C, machine learning-based model 502 may be deployed directly to device 12 for on-box execution, thereby allowing device 12 to assess its own device data, to determine its health status. Similar to the cloud-based implementations, actions taken by the executor of model 502 can include providing information regarding the health status assessment of device 12 to a user interface and/or automatically making configuration changes to device 12, based on the health status assessment by model 502.

Figure 6:
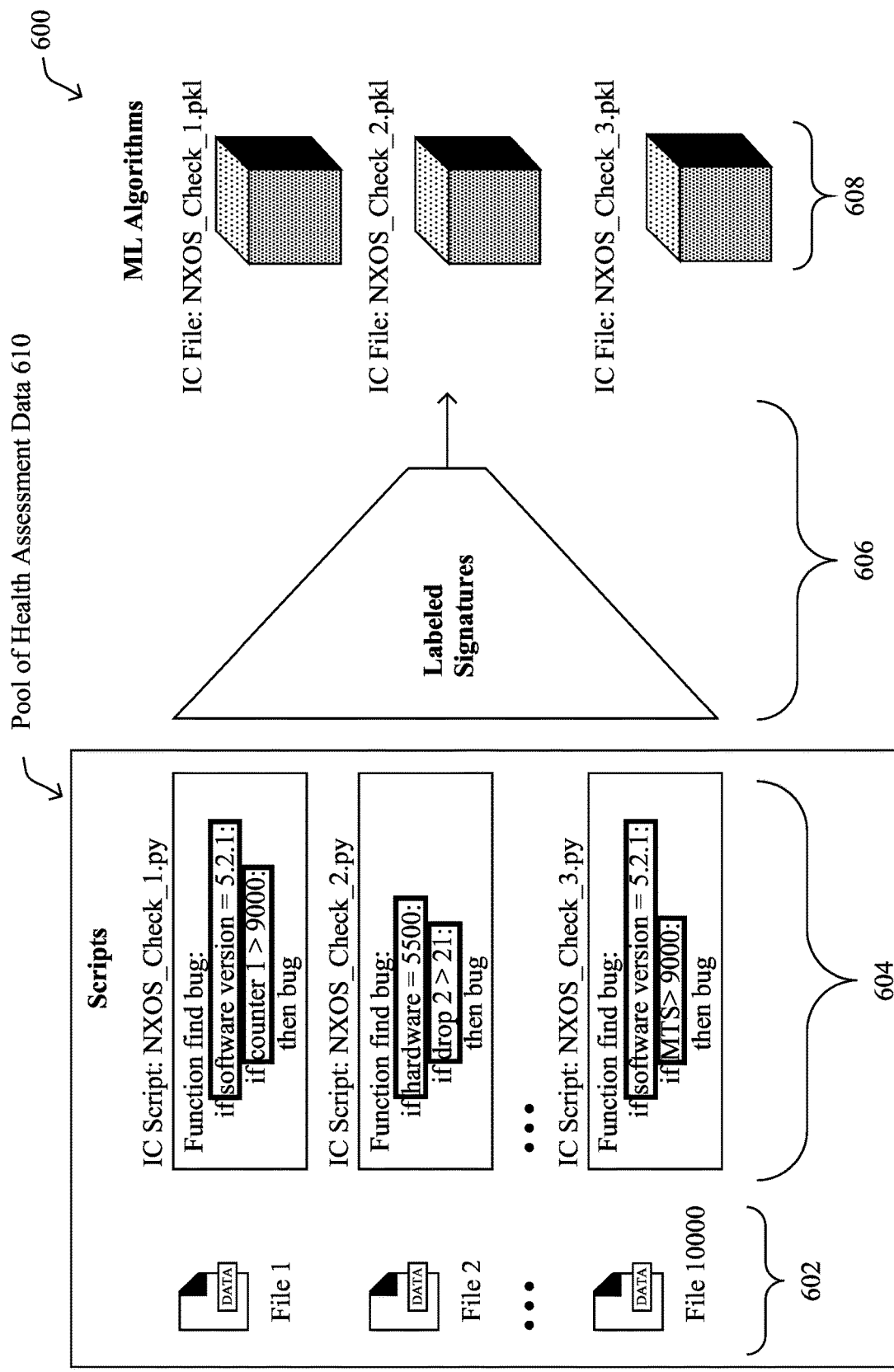
FIG. 6 illustrates an example of training machine learning models from health assessment data.

FIG. 6 illustrates an example 600 of training machine learning models from health assessment data, according to various embodiments. As shown, assume that the device health assessment service maintains a health assessment data pool 610. In general, health assessment data pool 610 includes the various forms of existing data that can be leveraged by a health assessment service to make a device health assessment. For example, health assessment data pool 610 may include n-number of files 602 that contain any or all of the following:

1. Health assessment data provided from customers in support cases.
2. Health assessment data collected during internal QA testing.
3. Health assessment data collected from connected customers to the cloud.

In addition, as shown, health assessment data pool 610 may include other forms of health assessment data such as insights and/or health assessment scripts 604 that may be entered by support engineers, in various embodiments. An example format for insights may be as follows:

Condition A:
regex: nxos
output:
command: show hw
Condition B:
regex:
output: 7.2(1)
command: show ver
Logic: A and B Similarly, an example script, which may be written in Python or any other suitable scripting language, is as follows:

```
#!/usr/bin/env python
Issue = False
show_tech = Squarewheels ('file')
For line in show_tech['show ver']:
    if re.match (r'x', line):
        issue = True
```

From the health assessment data pool 610, the device health assessment service may extract out the health status indicators, as well as their corresponding health statuses, to form a set of device signatures that are labeled with their corresponding health statuses. In general, a health status indicator may be any characteristic of a networking device that may be associated with a particular health status. For example, a health status indicator may be a certain device hardware or software version, configuration parameter setting, or the like.

By way of example, consider health assessment scripts 604. From these scripts, the device health assessment service may extract out their constituent health status indicators. In some cases, the health status indicators in scripts 604 may be extracted from 'if' conditions present in scripts 604. For example, "if software_version=5.2.1," and "if counter_1>9000" in a first script 604 may give way to software_version=5.2.1 and counter_1>9000 as indicators for the health status 'bug,' a particular type of bug.

Using the extracted health status indicators, the device health assessment service may form health status signatures 606 that can be used to train machine learning algorithms/models 608. Notably, the service may form a training dataset by labeling the extracted health status indicators with their corresponding health statuses and using the training dataset to train the machine learning models. For example, the service may use the signatures to train a random forest model that, given the device data for a particular networking device, determines whether the device has a particular health status or not (e.g., whether a particular bug affects the device, etc.).

The device health assessment service can similarly extract out health status indicators from any insights entered into the service by support engineers. For example, the service can generate the training data synthetically by converting the logic inside the insights into a truth table representation of the logic. In turn, the service can use the truth table to train a decision tree on the generated truth table, resulting in a machine learning model that perfectly represents the logic in the insight. In other words, the service may extract out the health status indicators from health assessment data pool 610 that are indicative of a particular health status. In turn, this information can be used as the training data set on which models 608 are trained.

After training models 608, the service may validate the efficacy of a machine learning-based model 608 using, for example, collected issue statistics that have been labeled appropriately. For example, in the case of insight-based training, all available statistical data may be used to validate the models. Preliminary experimentation has shown that these types of models can exhibit accuracy, precision, and recall up to 100%. For the script-based training, the service may designate a certain percentage of the statistical data for training and the remainder for model validation. Preliminary experimentation of the techniques herein used 20% of the available data for model validation, which indicated that the script-based models were able to achieve accuracy, precision, and recall of up to 95%. In some embodiments, models that do not exhibit a predefined threshold of performance may be ignored for purposes of deployment to a target network.

As would be appreciated, the device health assessment service may retrain and redeploy a model periodically, on demand, or in response to the creation of a new insight or script. In some cases, the resulting models can be packaged as a Python library, allowing it to be installed on virtually any operating system. This also makes it possible to execute the resulting models on a networking device, directly.

Figure 7:
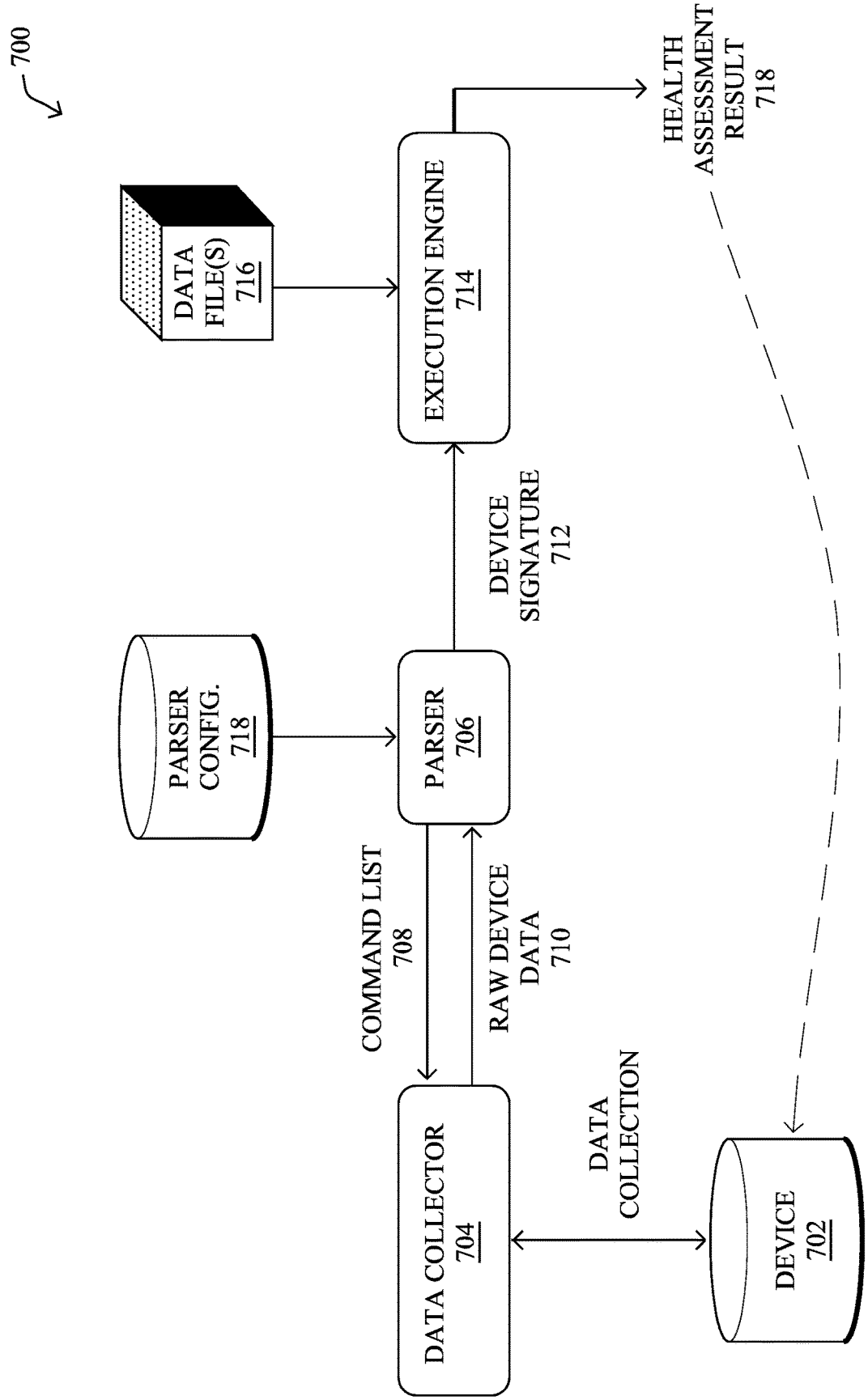
FIG. 7 illustrates an example architecture for using a machine learning-based model to evaluate the health status of a networking device.

FIG. 7 illustrates an example architecture 700 for using a machine learning-based model to evaluate the health status of a networking device, according to various embodiments. In various embodiments, architecture 700 may be implemented in the local network of the networking device 702 under scrutiny or, in some cases, directly on device 702. Device 702 may be any form of networking device that supports communications in the network such as, but not limited to, a router, switch, access point, access point controller, or the like.

As detailed above, architecture 700 may include an execution engine 714 configured to execute the various machine learning-based models deployed to the local network, such as part of health assessment data file(s). During execution, engine 714 may assess the health of device 702 to form a health assessment result 718. Depending on the mechanisms available, an indication of health assessment result 718 may be provided to a user interface for review and/or may be used to automatically adjust the configuration of device 702. For example, if health assessment result 718 indicates that device 702 is exhibiting a bug that could be corrected by a software update, execution engine 714 may cause the update to be downloaded to device 702.

As shown, architecture 700 may also include a data collector 704 that configured to collect device data 710 from device 702 based on any number of input commands. For example, data collector 704 may provide a command line interface (CLI) via which various commands can be used to query the operational and/or configurational state of device 702. Example CLI command may include "show ver" to query the software version on device 702, "show hw" to query the hardware version or model of device 702, etc.

In various embodiments, architecture 700 may further include a parser 706 that serves as an intermediary module between execution engine 714 and data collector 704. During execution, parser 706 may perform any or all of the following functions:

Interpret raw device data 710 collected from device 702 from data collector 704 into a device signature 712 for input to execution engine 714. Note that signature 712 is unlabeled, initially, from parser 706 and the machine learning model(s) of execution engine 714 may apply the appropriate device health status label to it.

Send a command list 708 to data collector 704 for collection of the raw device data 710, as needed by execution engine 714. For example, command list 708 may include the CLI commands needed to retrieve the device data needed by execution engine 714 to perform a certain set of one or more health assessments.

Parser configuration 718 for parser 706 can be based on feature extraction from the health assessment data of the device health assessment service, according to various embodiments. Notably, the health assessment data of the service may further indicate the corresponding commands needed to retrieve the relevant health status indicators from the device under scrutiny. For example, assume that the health assessment data of the service includes the following logic and associated commands:

Logic: ('feature lldp' and '6.2(2)')
Commands: show run, show ver

From the above, the "show run" and "show ver" commands are associated with the "lldp" and "6.2(2)" health status indicators, respectively. Accordingly, the service can use this association to construct lists of commands that can be passed to data collector 704, for collection of the relevant data for input to the machine learning-based model performing the health assessment.

In some cases, parser 706 may also use parser configuration 718 to convert the raw device data 710 into a device signature 712. Such a signature 712 may be, for example, an input feature vector for the machine learning-based model executed by engine 714 (e.g., a high dimensional array, such as a numpy array). Notably, each dimension of the feature vector may indicate whether device 702 has a particular feature or not. For example, parser configuration 718 may include the following mapping of commands to device features:

Show hw:
Feature_name: c17d34aa32
Feature_regex: nxos
Show ver:
Feature_name: be7894fa54
Feature_regex: 7.2(1),
Feature_name: sdf3562467
Feature_regex: 6.2(2)
Show run:
Feature_name: d739561788
Feature_regex: feature lldpç
Show host license-id:
Feature_name: entitlement
Feature_regex: FOXHSGU345

In other words, each command may be associated with one or more features of the device signature 712. Depending on the resulting raw device data 710 returned by data collector 704, parser 706 may then signify whether device 702 has that particular feature (e.g., device 702 is using software version 6.2(2), device 702 is using nxos hardware, etc. From this, an example device signature 712 is as follows:

{c17d34aa32:0, be7894fa54: 1, sdf3562467:1, d739561788:1, . . . , entitlement:1} where '0' indicates that device 702 does not have that particular feature and '1' indicates that device 702 does have that feature. Thus, the above signature indicates that device 702 is not an nxos device, is running software versions 7.2(1) and 6.2(2), supports the Link Layer Discovery Protocol (LLDP), etc. Such a device signature 712 can then be fed as input to a machine learning-based model, to determine whether device 702 has a particular heath status, based on the features in device signature 712.

As would be appreciated, device signature 712 of device 702 may change over time. Accordingly, signature 712 may be recomputed periodically, on configuration change to device 702 (e.g., after a software update, etc.), or on demand, as needed. Similar to data files 716 and/or execution engine 714, parser 706 and/or parser configuration 718 may be packaged and deployed as one or more libraries in Python or another suitable language.

Thus, by summarizing the health assessment data that the device health assessment service may use to determine the health status of a networking device into one or more machine learning-based model(s), the models can be deployed for execution in the local network itself without: 1.) requiring device data to leave the local network for assessment and 2.) revealing the specifics of the health assessment data of the service.

Figure 8:
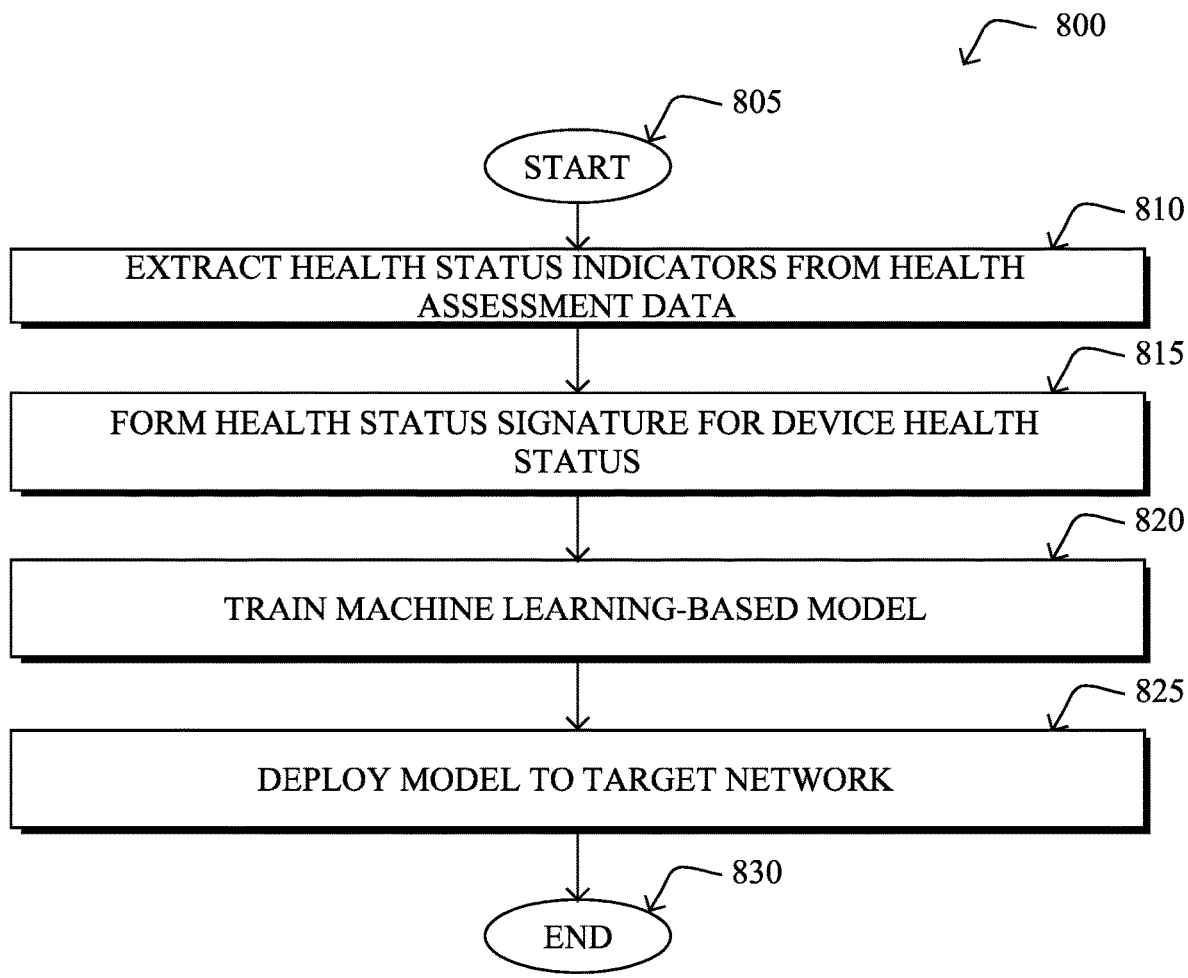
FIG. 8 illustrates an example simplified procedure for deploying a machine learning-based model to a target network for device health assessments.

FIG. 8 illustrates an example simplified procedure for deploying a machine learning-based model to a target network for device health assessments, in accordance with one or more embodiments described herein. For example, a non-generic, specifically configured device (e.g., device 200) may perform procedure 800 by executing stored instructions (e.g., process 248), to provide a device health assessment service. The procedure 800 may start at step 805, and continues to step 810, where, as described in greater detail above, the service may extract device health status indicators from health assessment data that the service uses to determine a device health status of a networking device. For example, the health assessment data may include insights and/or scripts that the service may leverage, to determine whether a particular networking device under scrutiny has a particular health status. Such indicators may correspond to device conditions, parameter settings, or the like that are associated with a particular health status.

At step 815, as detailed above, the service may form, using the extracted set of device health status indicators, a health status signature for a particular device health status. For example, a particular bug may affect networking devices of a certain hardware type that are running a particular operating system version and have a certain set of parameter settings.

At step 820, the service may train, based in part on the health status signature, a machine learning-based model to classify whether a networking device has the particular device health status. Such a model may be a random forest classifier or other machine learning-based model configured to take as input the feature data for the networking device under scrutiny and classify whether the device has the particular health status.

At step 825, as detailed above, the service may deploy the machine learning-based model to a target network for local device health assessment of one or more networking devices in the target network. In some embodiments, the service may deploy the model to the networking device under scrutiny for direct execution by the device in the local network. In other embodiments, the service may deploy the model for use by a local health assessment service operating in the target network. In further embodiments, the service may also deploy a parser to the target network that is configured to convert raw data obtained from a device under scrutiny into a device signature for input to the model. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for device health assessment data to be summarized into machine learning models and packaged for deployment to target networks (e.g., as a Python library, etc.). By leveraging technologies such as Python Pip and Python private repositories, the models can be easily installed and updated on many different devices. In further aspects, in contrast to having to parse device data for each script of the health assessment data, the machine learning-based model allows for all parsing to be performed at the beginning of execution, such as by aggregating the features of the device into an input feature vector for the model.

While there have been shown and described illustrative embodiments that provide for device health assessment data summarization using machine learning, it is to be understood that various other adaptations and modifications may be made within the spirit and scope of the embodiments herein. For example, while certain embodiments are described herein with respect to using certain models for purposes of classifying the health status of a networking device, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   extracting, by a device health assessment service, device health status indicators from health assessment data that the service uses to determine a device health status of a networking device;
   forming, by the device health assessment service and using the extracted device health status indicators, a health status signature for a particular device health status by labeling each of the extracted device health status indicators with a corresponding health status;
   training, by the device health assessment service and based in part on the health status signature, a machine learning-based model to classify whether the networking device has the particular device health status, wherein training data for the machine learning-based model is generated synthetically by converting logic inside the health status signature into a truth table representation of the logic;
   deploying, by the device health assessment service, the machine learning-based model to a target network for local device health assessment of one or more networking devices in the target network;
   generating, by the device health assessment service, a command line output parser configured to form a device signature from one or more command line outputs of the networking device; and
   deploying, by the device health assessment service, the command line output parser to the target network, wherein the machine learning-based model takes the device signature from the command line output parser as input to classify whether a networking device with the device signature has the particular device health status.

2. The method as in claim 1, wherein the one or more networking devices in the target network comprise at least one of: a network router or a network switch.

3. The method as in claim 1, wherein the health assessment data comprises a set of one or more health assessment scripts that assess the one or more command line outputs of the networking device.

4. The method as in claim 1, wherein the machine learning-based model comprises a random forest classifier.

5. The method as in claim 1, wherein the machine learning-based model is executed in the target network by the networking device whose device health status the machine learning-based model is to assess.

6. The method as in claim 1, wherein the machine learning-based model is configured to provide an indication as to whether the networking device has the particular device health status to a user interface.

7. The method as in claim 1, further comprising:
   using, by the device health assessment service, the health assessment data to determine a device health status of the networking device, based on the one or more command line outputs of the networking device.

8. An apparatus, comprising:
   one or more network interfaces to communicate with a network;
   a processor coupled to the network interfaces and configured to execute one or more processes; and
   a memory configured to store a process executable by the processor, the process when executed configured to:
      extract device health status indicators from health assessment data that the apparatus uses to determine a device health status of a networking device;
      form, using the extracted device health status indicators, a health status signature for a particular device health status by labeling each of the extracted device health status indicators with a corresponding health status;
      train, based in part on the health status signature, a machine learning-based model to classify whether the networking device has the particular device health status, wherein training data for the machine learning-based model is generated synthetically by converting logic inside the health status signature into a truth table representation of the logic;
      deploy the machine learning-based model to a target network for local device health assessment of one or more networking devices in the target network;
      generating, by the device health assessment service, a command line output parser configured to form a device signature from one or more command line outputs of the networking device; and
      deploying, by the device health assessment service, the command line output parser to the target network, wherein the machine learning-based model takes the device signature from the command line output parser as input to classify whether a networking device with the device signature has the particular device health status.

9. The apparatus as in claim 8, wherein the one or more networking devices in the target network comprise at least one of: a network router or a network switch.

10. The apparatus as in claim 8, wherein the health assessment data comprises a set of one or more health assessment scripts that assess the one or more command line outputs of the networking device.

11. The apparatus as in claim 8, wherein the machine learning-based model comprises a random forest classifier.

12. The apparatus as in claim 8, wherein the machine learning-based model is executed in the target network by the networking device whose device health status the machine learning-based model is to assess.

13. The apparatus as in claim 8, wherein the machine learning-based model is configured to provide an indication as to whether the networking device has the particular device health status to a user interface.

14. The apparatus as in claim 8, wherein the process when executed is further configured to:
  use the health assessment data to determine a device health status of the networking device, based on the one or more command line outputs of the networking device.

15. A tangible, non-transitory, computer-readable medium storing program instructions that cause a device health assessment service to execute a process comprising:
  extracting, by the device health assessment service, device health status indicators from health assessment data that the service uses to determine a device health status of a networking device;
  forming, by the device health assessment service and using the extracted device health status indicators, a health status signature for a particular device health status by labeling each of the extracted device health status indicators with a corresponding health status;
  training, by the device health assessment service and based in part on the health status signature, a machine learning-based model to classify whether the networking device has the particular device health status, wherein training data for the machine learning-based model is generated synthetically by converting logic inside the health status signature into a truth table representation of the logic;
  deploying, by the device health assessment service, the machine learning-based model to a target network for local device health assessment of one or more networking devices in the target network;
  generating, by the device health assessment service, a command line output parser configured to form a device signature from one or more command line outputs of the networking device; and
  deploying, by the device health assessment service, the command line output parser to the target network, wherein the machine learning-based model takes the device signature from the command line output parser as input to classify whether a networking device with the device signature has the particular device health status.

\* \* \* \* \*